US009643816B2

(12) United States Patent
Bachmann et al.

(10) Patent No.: US 9,643,816 B2
(45) Date of Patent: May 9, 2017

(54) METHOD AND DEVICE FOR DETERMINING THE REPLACEMENT STATE OF WEAR OF A SUPPORT MEANS OF AN ELEVATOR

(75) Inventors: Herbert Bachmann, Lucerne (CH); Tobias Noseda, Buchs (CH)

(73) Assignee: Inventio AG, Hergiswil (CH)

( * ) Notice: Subject to any disclaimer, the term of this patent is extended or adjusted under 35 U.S.C. 154(b) by 287 days.

(21) Appl. No.: 13/003,090

(22) PCT Filed: Jul. 15, 2009

(86) PCT No.: PCT/EP2009/059106
§ 371 (c)(1),
(2), (4) Date: Jan. 7, 2011

(87) PCT Pub. No.: WO2010/007112
PCT Pub. Date: Jan. 21, 2010

(65) Prior Publication Data
US 2011/0172932 A1 Jul. 14, 2011

(30) Foreign Application Priority Data
Jul. 18, 2008 (EP) .................................... 08160740

(51) Int. Cl.
*B66B 1/06* (2006.01)
*G06F 19/00* (2011.01)
*B66B 7/12* (2006.01)

(52) U.S. Cl.
CPC .......... *B66B 7/1215* (2013.01); *B66B 7/1238* (2013.01)

(58) Field of Classification Search
CPC ....... B66B 5/00; B66B 5/0006; B66B 5/0037; B66B 5/0018; B66B 7/12; B66B 15/04; B66B 5/0031; B66B 5/185; B66B 5/0025; B66B 7/1215; B66B 7/1238
USPC .................................... 702/34; 187/393, 391
See application file for complete search history.

(56) References Cited

U.S. PATENT DOCUMENTS 4,387,436 A * 6/1983 Katayama et al. ............. 702/94
5,731,528 A * 3/1998 Yamazaki et al. ......... 73/862.41
2002/0104715 A1* 8/2002 Zaharia et al. ............... 187/391
2007/0080027 A1* 4/2007 De Jong et al. .............. 187/383
2008/0202863 A1* 8/2008 Rossignol et al. ............ 187/393

FOREIGN PATENT DOCUMENTS

JP 11035246 A * 2/1999 .............. B66B 5/02

OTHER PUBLICATIONS

English translation of Ishida (JP 11035246 A) has been provided.*

* cited by examiner

*Primary Examiner* — Mischita Henson
*Assistant Examiner* — Yoshihisa Ishizuka
(74) *Attorney, Agent, or Firm* — Fraser Clemens Martin & Miller LLC; William J. Clemens

(57) ABSTRACT

A method for determining the degree service life end of a support cable of an elevator, wherein the support cable is routed over a drive sheave and/or one or more return pulleys and connects a car to a counterweight, includes the steps of: the support cable is subdivided into a plurality of sections; and for each of the sections, a determination is made as to whether the section passes over the drive sheave and/or one or more of the return pulleys during a trip, and if this is the case, a usage level representing the degree of service life use is increased accordingly.

14 Claims, 6 Drawing Sheets

| Height | cage position (storey) | Position of the pulley referred to the cable start (fastening pont 6) Pulley 1 | Pulley 2 | Pulley 3 | Pulley 4 |
|---|---|---|---|---|---|
| 150 | 50 | 150,8 | 302,6 | 307,6 | 309,3 |
| ... | ... | ... | ... | ... | ... |
| 120 | 40 | 120,8 | 242,6 | 277,6 | 279,3 |
| 117 | 39 | 117,8 | 236,6 | 274,6 | 276,3 |
| 114 | 38 | 114,8 | 230,6 | 271,6 | 273,3 |
| 111 | 37 | 111,8 | 224,6 | 268,6 | 270,3 |
| 108 | 36 | 108,8 | 218,6 | 265,6 | 267,3 |
| 105 | 35 | 105,8 | 212,6 | 262,6 | 264,3 |
| 102 | 34 | 102,8 | 206,6 | 259,6 | 261,3 |
| 99 | 33 | 99,8 | 200,6 | 256,6 | 258,3 |
| 96 | 32 | 96,8 | 194,6 | 253,6 | 255,3 |
| 93 | 31 | 93,8 | 188,6 | 250,6 | 252,3 |
| 90 | 30 | 90,8 | 182,6 | 247,6 | 249,3 |
| 87 | 29 | 87,8 | 176,6 | 244,6 | 246,3 |
| 84 | 28 | 84,8 | 170,6 | 241,6 | 243,3 |
| 81 | 27 | 81,8 | 164,6 | 238,6 | 240,3 |
| 78 | 26 | 78,8 | 158,6 | 235,6 | 237,3 |
| 75 | 25 | 75,8 | 152,6 | 232,6 | 234,3 |
| 72 | 24 | 72,8 | 146,6 | 229,6 | 231,3 |
| 69 | 23 | 69,8 | 140,6 | 226,6 | 228,3 |
| 66 | 22 | 66,8 | 134,6 | 223,6 | 225,3 |
| 63 | 21 | 63,8 | 128,6 | 220,6 | 222,3 |
| 60 | 20 | 60,8 | 122,6 | 217,6 | 219,3 |
| 57 | 19 | 57,8 | 116,6 | 214,6 | 216,3 |
| 54 | 18 | 54,8 | 110,6 | 211,6 | 213,3 |
| 51 | 17 | 51,8 | 104,6 | 208,6 | 210,3 |
| 48 | 16 | 48,8 | 98,6 | 205,6 | 207,3 |
| 45 | 15 | 45,8 | 92,6 | 202,6 | 204,3 |
| 42 | 14 | 42,8 | 86,6 | 199,6 | 201,3 |
| 39 | 13 | 39,8 | 80,6 | 196,6 | 198,3 |
| 36 | 12 | 36,8 | 74,6 | 193,6 | 195,3 |
| 33 | 11 | 33,8 | 68,6 | 190,6 | 192,3 |
| 30 | 10 | 30,8 | 62,6 | 187,6 | 189,3 |
| 27 | 9 | 27,8 | 56,6 | 184,6 | 186,3 |
| 24 | 8 | 24,8 | 50,6 | 181,6 | 183,3 |
| 21 | 7 | 21,8 | 44,6 | 178,6 | 180,3 |
| 18 | 6 | 18,8 | 38,6 | 175,6 | 177,3 |
| 15 | 5 | 15,8 | 32,6 | 172,6 | 174,3 |
| 12 | 4 | 12,8 | 26,6 | 169,6 | 171,3 |
| 9 | 3 | 9,8 | 20,6 | 166,6 | 168,3 |
| 6 | 2 | 6,8 | 14,6 | 163,6 | 165,3 |
| 3 | 1 | 3,8 | 8,6 | 160,6 | 162,3 |
| 0 | 0 | 0,8 | 2,6 | 157,6 | 159,3 |

| | Journey 1: 0 to 8 | Journey 2: 8 to 32 | Journey 3: 32 to 25 | Journey 4: 25 to 0 |
|---|---|---|---|---|
| | Pulley 1: | Pulley 1: | Pulley 1: | Pulley 1: |
| Start | 0,8 | 24,8 | 96,8 | 75,8 |
| End | 24,8 | 96,8 | 75,8 | 0,8 |
| | *Pulley 2:* | *Pulley 2:* | *Pulley 2:* | *Pulley 2:* |
| Start | 2,6 | 50,6 | 194,6 | 152,6 |
| End | 50,6 | 194,6 | 152,6 | 2,6 |
| | Pulley 3: | Pulley 3: | Pulley 3: | Pulley 3: |
| Start | 157,6 | 181,6 | 253,6 | 232,6 |
| End | 181,6 | 253,6 | 232,6 | 157,6 |
| | Pulley 4: | Pulley 4: | Pulley 4: | Pulley 4: |
| Start | 159,3 | 183,3 | 255,3 | 234,3 |
| End | 183,3 | 255,3 | 234,3 | 159,3 |

METHOD AND DEVICE FOR DETERMINING THE REPLACEMENT STATE OF WEAR OF A SUPPORT MEANS OF AN ELEVATOR

FIELD OF THE INVENTION

The invention relates to a method and a device for determining the replacement state of wear of a support means of an elevator.

In an elevator the car is held and moved by a support means, wherein the support means during operation wears with time and is periodically exchanged. If, however, the support means is exchanged before it is actually ready for discard, unnecessary costs arise and the service interval is needlessly shortened. If, however, it is not recognized in good time that the support means is ready for discard, significant safety risks can arise. It is therefore important to be able to determine as precisely as possible when a support means is worn to such an extent that it has to be exchanged.

BACKGROUND OF THE INVENTION

If steel cables or steel belts serve as support means, the replacement state of wear is determined in that the number of wire breakages is counted or in that the support means is magnetically inductively monitored. However, this method is not suitable or is suitable only to a limited extent for aramide cables as support means.

A method of detecting the wear of the support cable of an elevator is known from the specification JP 11 035 246 A. The part of the support cable which slips on the drive pulley is exposed to the greatest wear. In addition, slipping of the support cable on the drive pulley has the effect that the journey time is extended. A correlation thus exists between the degree of wear and the journey time. This correlation is now used in the method for detection of the wear in order to make a conclusion about the degree of wear from the ascertained journey times.

Initially the car call signals are detected and the journey times needed by the car to go from the call floors to the destination floors are calculated therefrom. The calculated journey times are subsequently compared with wear values in order to ascertain that shaft section in which the car moves most frequently. The wear of the corresponding cable section is now investigated on the basis of this recognition.

However, this form of embodiment has the following disadvantage. Due to the fact that the journey time depends not only on slip, but also additionally on some other parameters such as, for example, the load in the car, only relatively imprecise conclusions about the prevailing slip can be made by detection of the journey time. If the journey time lengthens, this can have various causes. A stronger degree of slip is merely one of several possible causes.

SUMMARY OF THE INVENTION

It is an object of the invention to indicate a method and a device for determining the replacement state of wear of a support means of an elevator by which the replacement state of wear of the support means can be determined particularly precisely.

In the method according to the invention for determining the replacement state of wear of a support means of an elevator, in which the support means is guided over a drive pulley and/or one or more return rollers and a car is connected with a counterweight, the support means is divided up into several sections. It is determined for each of the sections whether the section during a journey passes over the drive pulley and/or one or more of the return rollers and, if this is the case, a degree of readiness for discard representing the replacement state of wear is correspondingly increased.

The device according to the invention for determining the replacement state of wear comprises, additionally to the above-mentioned features, a control for controlling the elevator and an evaluating unit connected with the control. The evaluating unit is constructed and operable in such a manner that it determines the degree of readiness for discard for each of these sections on the basis of the data, which is obtained by the control, about the travel destinations.

In one form of embodiment of the method according to the invention the nature of the bending is determined and taken into consideration in the section-by-section determination of the degree of readiness for discard. This is of advantage particularly in the case of reciprocal bendings, because this can lead to particularly strong wear of the support means.

In a further form of embodiment of the method according to the invention there is detection, for determination of the nature of the bending, of which return roller causes which bending.

In advantageous manner, in the method according to the invention a reverse bending is taken into consideration more strongly in the determination of the degree of readiness for discard than a simple bending.

Moreover, it is of advantage if in the method according to the invention the looping angle is taken into consideration in the section-by-section determination of the degree of readiness for discard. The determination of the replacement state of wear can thereby take place more precisely.

In addition, it is also of advantage if in the method according to the invention the diameter of the return rollers is taken into consideration in the section-by-section determination of the degree of readiness for discard. The determination of the replacement state of wear can as a result also be carried out more precisely.

In order to fulfill the object it is further proposed that in the method according to the invention a service report is produced when the degree of readiness for discard has exceeded a defined value for one of the sections. In this manner it is possible to dispense with regular manual checks of the degree of readiness for discard, which is determined by the method, in the replacement state of wear.

According to a further feature of the invention the support means is additionally monitored by an optical checking device. The determination of the replacement state of wear can thereby be carried out more precisely and reliably.

DESCRIPTION OF THE DRAWINGS

The invention is further explained in the following by way of example with reference to seven figures, in which.

DESCRIPTION OF PREFERRED EMBODIMENTS

In order to determine the service life of a support means, for example an aramide cable, appropriate tests are carried out beforehand and utilization is made of empirical values. The arrangement of the drive pulley, the return rollers, the cable guide, the looping angle and the drive pulley and return roller diameters, in particular, have an influence on the service life or wear. The knowledge obtained therefrom leads to a bending cycle count which indicates how many bending cycles are permissible as a maximum before the support means is ready for discard. The bending cycle count is also termed limit bending cycle count in the following. The more often the support means is bent, the greater the degree of wear thereof.

In order to ensure that the service life and thus the replacement state of wear of the support means can be determined as precisely as possible, the permissible number of bending cycles of that support means section which is loaded the most plays an important role. As long as the bending cycle count of the support means section loaded the most is not exceeded, the support means still does not need to be exchanged.

In the forms of embodiment of the invention described here all kinds of rollers are termed return rollers. Thus, for example, deflecting rollers also come within the term "return rollers".

First Form of Embodiment

Figure 1:
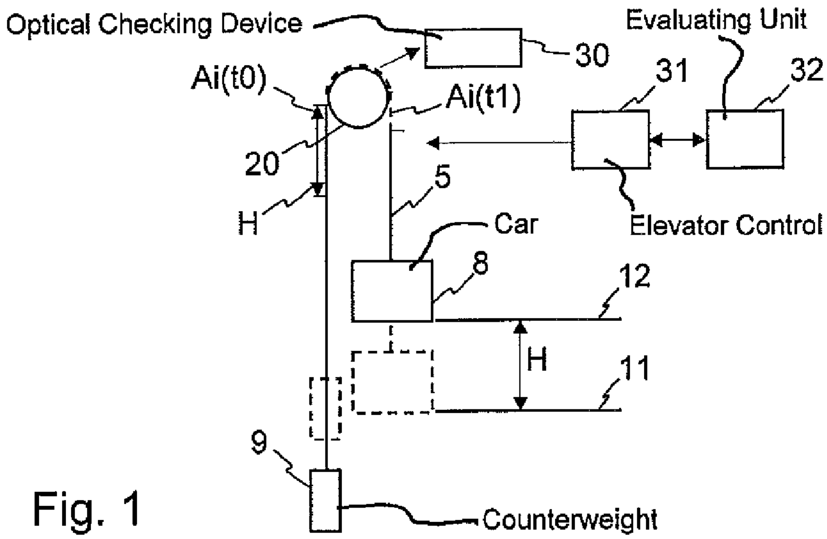
FIG. 1 shows a simplified illustration of an elevator with a drive pulley.

A simplified illustration of an elevator with a 1:1 suspension is illustrated in FIG. 1. A car 8 is connected with a counterweight 9 by way of a support means 5, which in the following is also termed support cable or, for short, cable. The support means 5 can also be a strap or belt and is guided over a drive pulley 20. In order to move the car 8 from one floor 12 to another floor 11 the support means 5 is driven by way of the drive pulley 20, which is coupled with a drive (not shown). In that case, at the beginning of the journey, thus at the time instant t0, the cable section Ai is, as shown in FIG. 1, disposed at the left below the drive pulley 20. The cable section Ai in this position carries the reference Ai(t0). At the end of the journey, thus at the time instant t1, the car 8 is located at the floor 11 and the cable section Ai now lies in part on the drive pulley 20. In this position the cable section Ai carries the reference Ai(t1). The control of the elevator takes place by means of an elevator control 31. Determination of the replacement state of wear of the support means 5 is carried out by means of an evaluating unit 32 connected with the elevator control 31.

In order to determine the replacement state of wear of the support means 5 initially the support means 5 is divided up into as many sections Ai as there are floors. There is then assigned to each floor that section of the support means which lies on the drive pulley 20 when the car 8 stands at the corresponding floor. Thus, for example, the section number A12 is assigned to that support means section which lies on the drive pulley 20 when the car is located in the floor 12. Each section of the support means has a length equal to the distance H between adjacent floors.

In addition, associated with each floor or the corresponding support means section is a memory position in which each journey to the floor, each journey from the floor in the opposite direction and each passage through the corresponding floor is counted. This is graphically represented in FIG. 2. Shown on the left is the shaft with, in total, 25 floors (−2 to 22) and on the right alongside a symbolic illustration of a first journey 1 of the car from the floor 0 to the floor 8. Shown further to the right alongside is the corresponding memory which in the following is also termed alternate bending counter. The memory has as many memory positions as the building has floors less one, i.e. in the present exemplifying embodiment thus in total 24 memory positions SP1 to SP24 for in total 24 cable sections A1 to A24. The first cable section A1 is located at the counterweight 9 and the 24th cable section A24 at the car 8.

If the elevator car 8 travels from the lowermost stopping point (floor −2) in upward direction, the first cable section A1 runs over the cable pulley 20. If the elevator car 8 thereagainst travels from the uppermost stopping point (floor 22) in downward direction the cable section A24 runs over the drive pulley 20.

Figure 2:
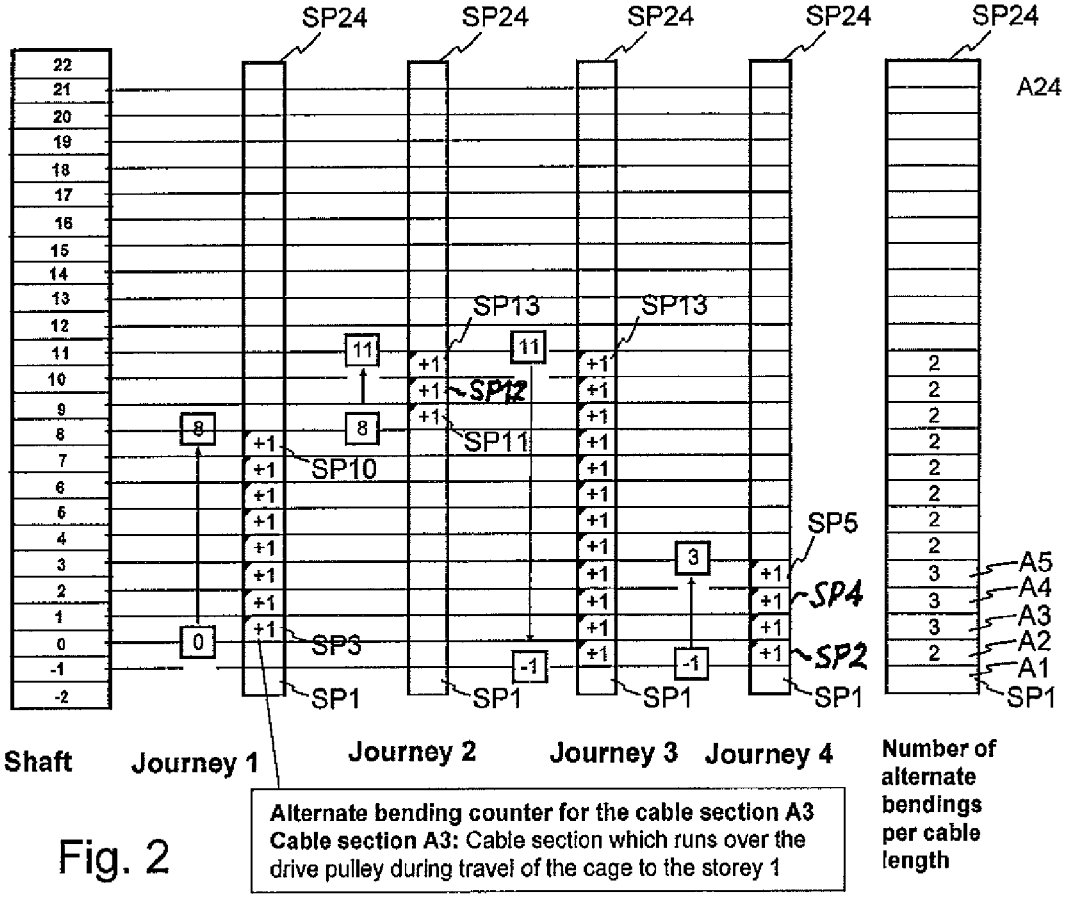
FIG. 2 shows the counting principle for an elevator according to FIG. 1.

In the example in FIG. 2 the car 8 travels in the journey 1 from the floor 0 to the floor 8. The evaluating unit 32 receives the floor information (call information) from the elevator control 31 and thereupon increases the contents of the corresponding eight memory positions SP3 to SP10 in each instance by the value one. This means that the cable sections A3 to A10 run over the drive pulley 20 and in that case are subjected to bending. During the journey 2 the car 8 travels from the floor 8 through three floors again upwardly to the floor 11. The cable sections A11 to A13 are thus moved over the drive pulley 20 and in that case subjected to bending. Accordingly, the values in the next three memory positions SP11, SP12 and SP13 are similarly increased by the value one. During the journey 3 the car travels from the floor 11 in downward direction to the floor −1. This has the consequence that the values in the corresponding memory positions SP13 to SP2 are again increased by the value one. Finally, the car during the journey 4 travels upwardly to the floor 3 so that the values in the corresponding memory positions SP2 to SP5 are again increased by the value one.

Illustrated on the right in FIG. 2 are the values which at the end of the journey 4 are added up during the four journeys and which are termed degree of readiness for discard R(A1) to R(AN). The largest value in the alternate bending memory corresponds with the maximum number of bending cycles of the elevator installation. As can be seen, in total three memory positions SP3, SP4 and SP5 are occupied by the value 3. This means that during the four journeys the three support means sections A3, A4 and A5 were each subjected three times to a bending cycle. A degree of readiness for discard R(A1)=0 thus results for the support means section A1, a degree of readiness for discard R(A2)=2 for the support means section A2 and degree of readiness for discard R(A3)=3 for the support means section A3. The cable sections A3, A4 and A5 thus have the greatest degree of readiness for discard R(A3)=R(A4)=R(A5)=3 and are thus exposed to the greatest amount of wear.

In order to detect the bending cycles the call data from the elevator control 31 can be used and evaluated. A Gray code can, for example, be used for that purpose.

The described form of embodiment can be integrated in the elevator control 31 or executed as separate apparatus, which is equipped with an appropriate interface with respect to the elevator control 31. The floor data can then be transmitted by way of the interface. The elevator control 31 and the evaluating unit 32 can be combined in the same housing or also in the same subassembly;

For each journey from one floor to another there is assigned to the floor that cable section which during the corresponding journey is bent around the drive pulley and the return roller. The alternate bending of each cable section is counted by the alternate bending counter. That cable section with the most alternate bendings is critical for the cable service life.

Second Form of Embodiment

Figure 3:
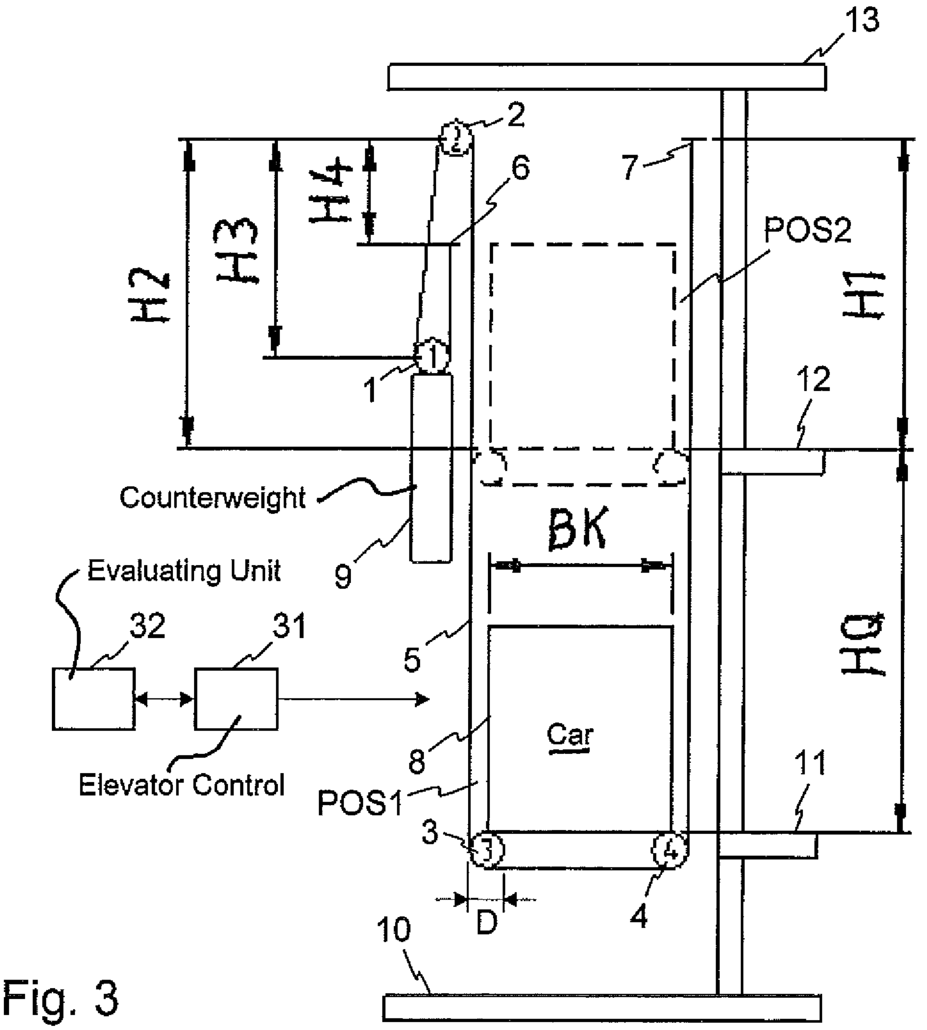
FIG. 3 shows a simplified illustration of an elevator with four return rollers.

The above considerations similarly apply to a suspension factor=2, i.e. a 2:1 suspension as shown in FIG. 3. The individual cable sections can be loaded, additionally to the bendings around the drive pulley 2, with bendings around the cable rollers 1, 3, 4 at the counterweight 9 or on the car 8. The cable rollers 1, 3, 4 are here also termed pulleys or return rollers.

In the second form of embodiment described here these bendings are not counted separately. It is assumed that each cable section is bent not only around the drive pulley 2, but also around the pulleys 1, 3, 4 at the counterweight 9 or the car 8. For this reason reference is made to bending cycles and not to alternate bendings. A bending cycle includes not only the bending around the drive pulley 2, but also the bendings around the corresponding pulleys 1, 3, 4. Bending cycles (bending of the same cable lengths around drive pulley 2 and pulleys 1, 3 4) is checked in the service life investigations. This manner of counting is therefore sufficiently safe. However, the possibility also exists of separately counting the individual bendings around the drive pulley 2 and the pulleys 1, 3, 4 (see third form of embodiment).

In advantageous manner an own limit bending cycle count is determined for each elevator layout (disposition) by appropriate service life tests with defined drive pulley diameters and pulley diameters.

Third Form of Embodiment

An elevator with a 2:1 suspension is illustrated in simplified form in FIG. 3. The support cable 5 is fastened at a first fastening point 6 to the shaft and is led around a first return roller 1 fastened to the counterweight 9, around a drive pulley 2 fastened to the shaft and around further return rollers 3 and 4, which are arranged on the underside of the car 8, to a second fastening point 7 in the shaft. The shaft is bounded downwardly by a floor 10 and upwardly by a ceiling 13.

Figure 4:
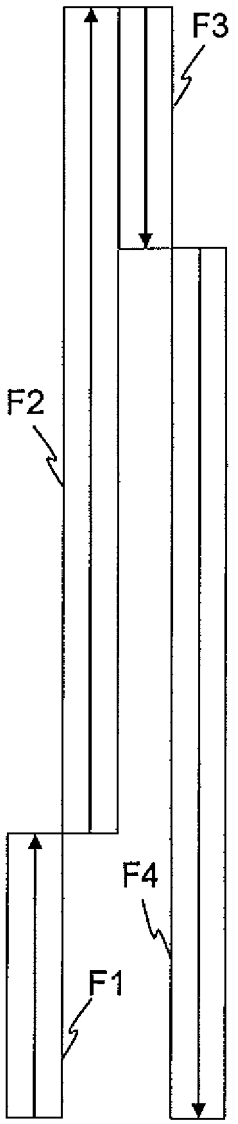
FIG. 4 shows a table and a diagram with four journeys of the elevator according to FIG. 3.

A table and a diagram with four journeys F1-F4 of the elevator are illustrated in FIG. 4. Indicated at the left in FIG. 4 is the shaft height in, by way of example, meters and on the right alongside the floors as numbers 0 to 50. Shown on the right alongside are four journeys F1 to F4. In the first journey F1 the car 8 travels from the floor 0 to the floor 8. In the second journey F2 the car 8 travels onward to the floor 32. In the third journey F3 the car 8 travels back to the floor 25. In the fourth journey F4 the car 8 finally travels back to the floor 0. Indicated in the four columns alongside on the right are the positions of the three pulleys 1, 3 and 4 as well as the drive pulley 2 on the cable 5 as absolute values in meters referred to the cable start at the fastening point 6.

FIG. 5 shows once again the diagram with the four journeys F1 to F4 of the elevator and thereunder the journey table resulting therefrom. It is apparent from this table which position the four pulleys 1 to 4 have on the support cable 5 at the beginning of the respective journey (start) and at the end of this journey. Thus, by way of example, in the first journey F1 the return roller 1 at the beginning is spaced 0.8 meters from the cable start (fastening point 6). At the end of the first journey F1 the return roller 1 is then disposed at a distance of 24.8 meters from the cable start. This means that 24.8 meters of cable are located between the return roller 1 and the fastening point 6. The cable during the journey F1 is thus rolled over on the pulley 1 on the length between 0.8 meters and 24.8 meters.

Figure 5:
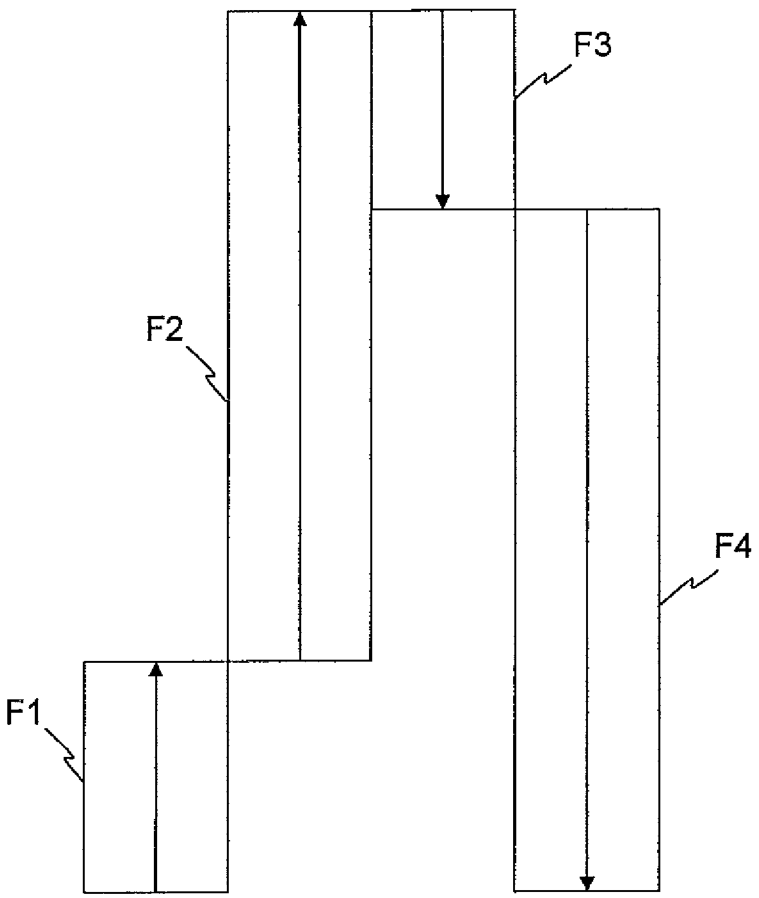
FIG. 5 shows again the diagram with the four journeys of the elevator and, below that, a journey table.
Figure 6:
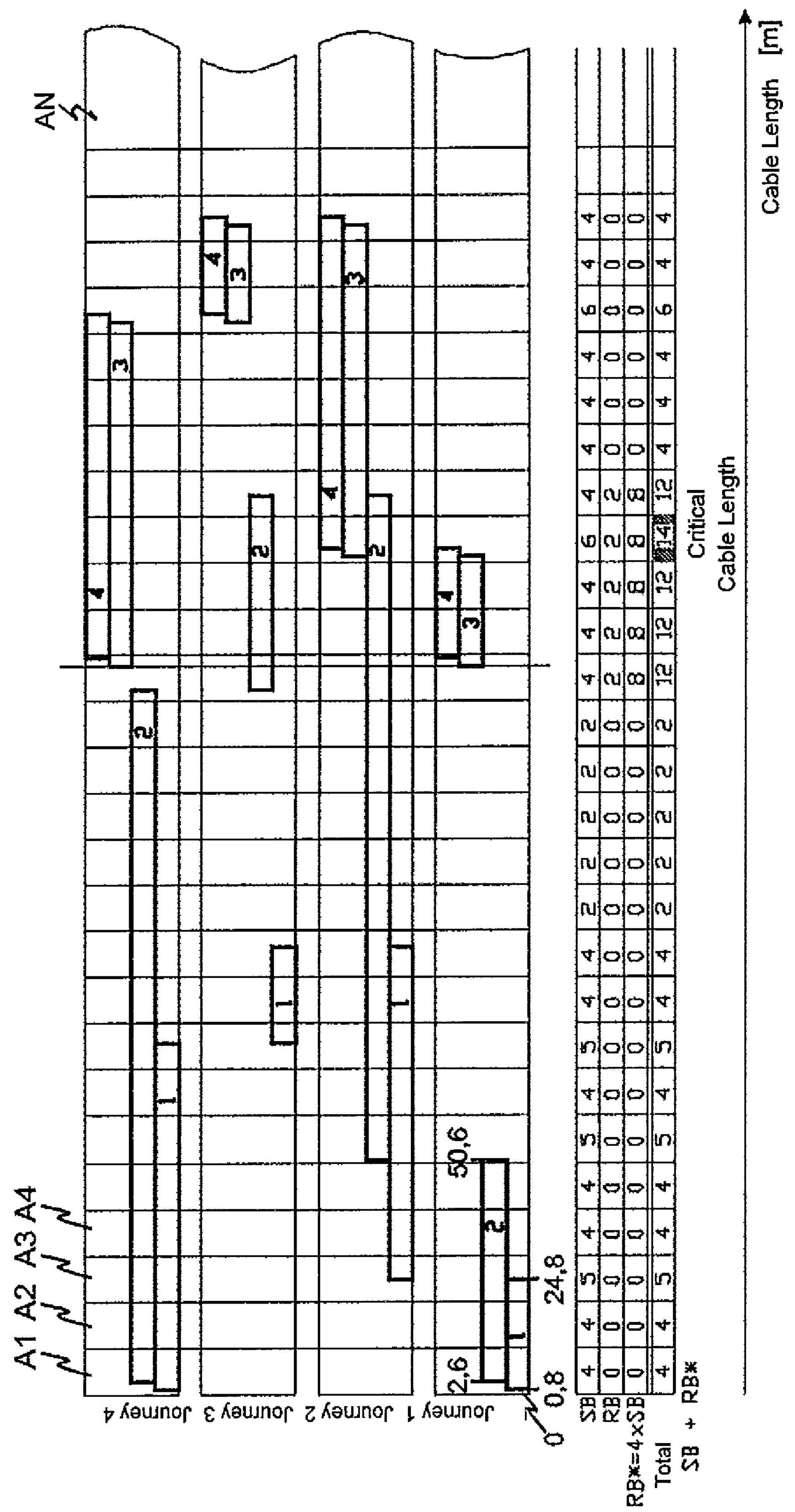
FIG. 6 shows a diagram with the positions of the return rollers on the individual cable sections.

The diagram shown in FIG. 6 in which the positions of the return rollers 1 to 4 are illustrated on the individual cable sections A1, A2, A3 to AN can be derived from the journey table shown in FIG. 5.

On the basis of the following formula it is indicated, by way of example, how for the pulley 1 the instantaneous position thereof (PosPulley1) on the cable 5 can be calculated:

$$\text{PosPulley1}=H3-H4+(HQ-\text{current floor})/(\text{number of floors})$$

wherein:

H3=spacing between return roller 1 and drive pulley 2

H4=spacing between cable start 6 and drive pulley 2

HQ=floor height

Figure 7:
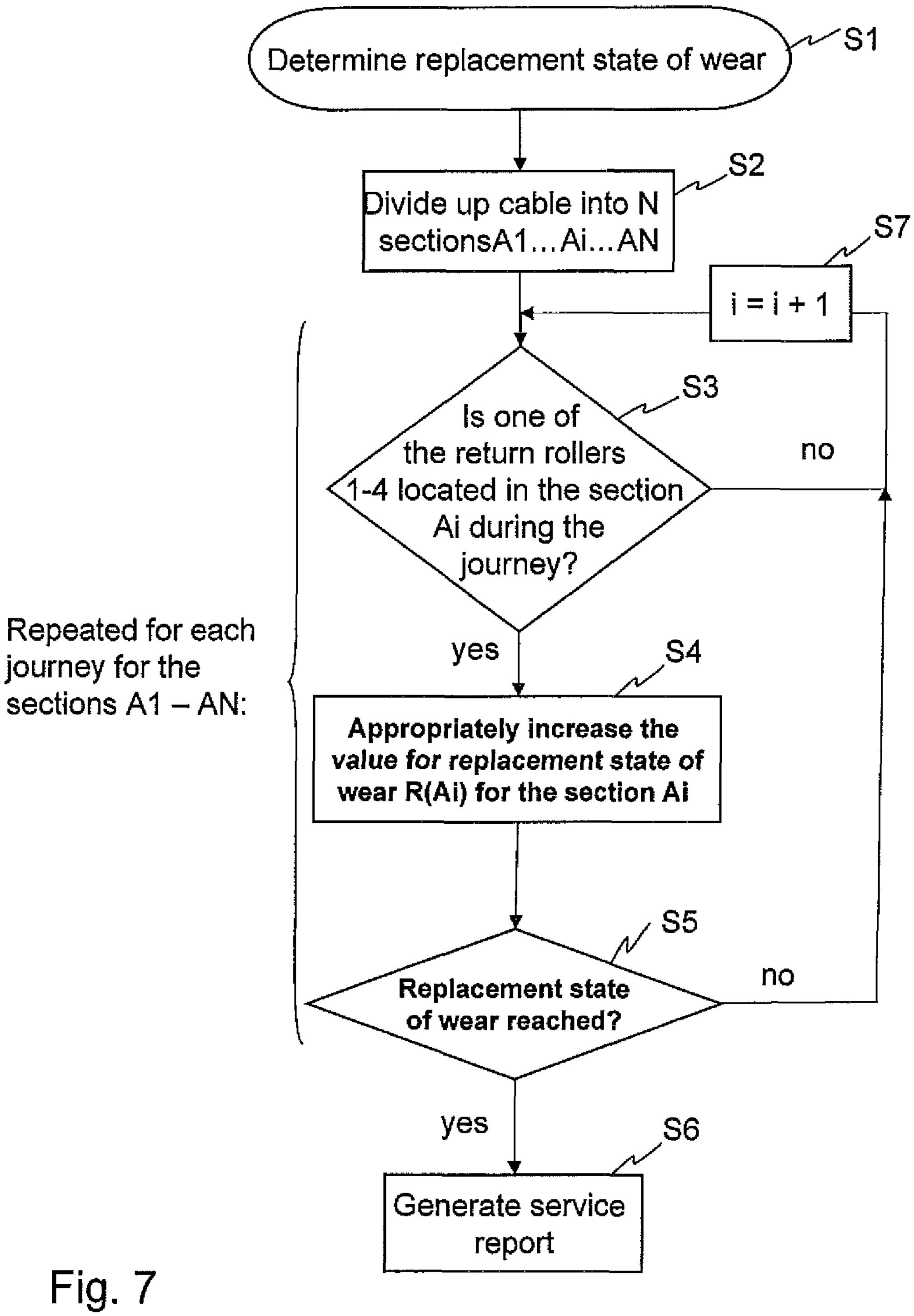
FIG. 7 shows a flow chart for the method for determining the replacement state of wear of a support means of an elevator.

FIG. 7 shows a flow chart for the method for determining the replacement state of wear of the support means of an elevator.

In an initialization phase (S1, S2) the cable 5 is subdivided into N sections A1 to AN and the positions of the pulleys 1 to 4 on the cable 5 are assigned to each floor 0-50. In that case the fastening point 6 forms the zero point or reference point. However, the reference point can, instead also be any other point such as, for example, the fastening point 7. The rolled-over cable length is thereafter ascertained for each journey F1 to F4 and each pulley 1 to 4 (see FIG. 5).

For each cable section A1 to AN (this can be as large or small as desired depending on the respective requirement) the number of rollings-over by the pulleys 1 to 4 is continuously recorded (FIG. 5 and S3, S4, S7 in FIG. 7). In that case, depending on the respective requirement the different bendings and the degree of damage thereof per pulley 1 to 4 can also be taken into consideration, for example diameter, looping angle, drive pulley, return roller, reverse bending, simple bending. The degree of damage or the number of alternate bendings is thus recognizable and capable of evaluation at any time for each cable section A1 to AN (see FIG. 6).

Those cable sections with the most or most damaging alternate bendings can be recognized at any time. A limit for the permissible damage, i.e. for the permissible number of reverse bending, can be imposed. If this number is reached (S5), a service report can be issued (S6) so as to indicate that the support means 5 should be exchanged. However, it is also possible to determine merely the section of the cable 5 which has received the greatest amount of damage. In the latter case this cable section can then be inspected visually or by means of auxiliary apparatus, for example magnetically inductively.

Reverse bendings, which are also termed reciprocal bendings, allow the support means 5 to wear more quickly and are therefore multiplied by a weighting factor GF=4 in FIG. 6 for calculation of the degree of readiness for discard R(Ai). Applicable in this case for the degree of readiness for discard R(Ai) of the cable section Ai is:

$$R(Ai)=SB+4*RB$$

wherein:

SB=the number of simple bendings

RB=the number of return bendings

A support means section Ai is subjected to a simple bending when this support means section Ai is bent at one of the return rollers 1, 3 or 4 or on the drive pulley 2 in a first direction. If this support means section Ai at a later point in time is bent in the opposite direction this support means section Ai is then also subjected to a reverse bending. Thus, for example, the support means section which is disposed at the car position POS1, which is shown in FIG. 3, at the return roller 3 is subjected to simple bending. Later, if the car 8 is located in the position POS2, the support means section is disposed on the drive pulley 2 and now also subjected to a reverse bending.

Whether a simple bending or a reverse bending is concerned results from the elevator layout and the stroke height. The evaluating unit 32 (FIG. 3) can thus ascertain on the basis of defined geometries, which result from the elevator layout, for example the parameters H1-H4, HQ and BK as well as the stroke height of the car 8, whether a specific cable section Ai is subjected during a journey to a simple bending and/or to a reverse bending.

The diameter of the return rollers 1 to 4 is characterized by the reference D. As already explained further above, the diameter D of the return rollers 1 to 4 can be taken into consideration in the determination of the replacement state of wear. Apart from that, the looping angle can also be taken into consideration in the determination of the replacement state of wear. Thus, for example, the weighting factor GF can be referred to the diameter D of the return roller 1 to 4. For a return roller 1 to 4 with a small diameter D the weighting factor GF is selected to be greater than in the case of a return roller 1 to 4 with a large diameter D. Equally, the weighting factor GF can be referred to the looping angle of the drive pulley 2. If the looping angle of the support means 5 on the drive pulley 2 is large the weighting factor GF is selected to be smaller than if the looping angle of the support means 5 on the drive pulley 2 is small. In addition, the weighting factor can be referred to the load hanging at the support means 5. The greater this load is, the greater is the weighting factor also selected to be.

The procedure can be analogous for a suspension factor >2.

In the past the maximum number of alternate bendings of the length of cable loaded the most was very difficult to ascertain, since the traffic patterns of each elevator are different and consequently it is not obvious which length of support means is loaded with the most alternate bendings. The number of journeys of an elevator also does not provide any indication. An advantage of the invention resides in the fact that the cables 5 can be discarded very individually and thus fully utilized. Were the replacement states of wear to be determined on the basis of journey numbers or by estimation, margins would have to be included which could cause high costs in maintenance. With the present invention the replacement state of wear of support means 5, for example of steel cables, aramide cables, straps or belts with tensile strands of steel wires or synthetic fibers, can be ascertained.

The support means 5 can additionally also be monitored by an optical checking device 30 (FIG. 1). The determination of the replacement state of wear can thereby be carried out more precisely and reliably. Use can be made of, for example, a video camera as optical checking device 30. However, the support means 5 can also be visually checked by a service engineer. In the optical check note can be taken of, for example, wire breakages, bubbles in the aramide support means and changes in the geometry of the support means 5.

The foregoing description of the exemplifying embodiments in accordance with the present invention serves only for illustrative purposes and not for the purpose of restriction of the invention. Various changes, combinations of the forms of embodiment and modifications are possible within the ambit of the invention without departing from the scope of the invention and equivalents thereof.

The invention claimed is:

1. A method for determining the replacement state of wear of a support means of an elevator, wherein the support means is guided over a drive pulley and/or at least one return roller and connects an elevator car with a counterweight, comprising the following steps:

providing a control for controlling the movement of the elevator, the control configured to receive call information from the elevator car and from building floors, the control further configured to direct movement of the elevator car to the selected floor and generate call data;

connecting an evaluating unit having a memory to the control, the evaluating unit configured to receive call data from the control;

dividing the support means into several sections, assigning to each one of the building floors a one of the sections that lies on the drive pulley when the elevator car stands at the corresponding building floor, and assigning an associated memory position in the memory as an alternate bending counter for each of the sections;

determining for each of the sections from the call data provided by the control whether the section during a journey of the elevator car passes over the drive pulley and/or the at least one return roller and if so increasing a degree of readiness for discard representing the replacement state of wear correspondingly for the section including counting alternate bending of each of the sections with the alternate bending counters which alternate bending is decisive for a service life of the section with a greatest number of the alternate bendings, wherein determining the degree of readiness for discard includes multiplying each of the alternate bendings by a weighting factor, the weighting factor selected based on at least one of a bending type, a return roller diameter, a looping angle, and a load;

generating from the evaluating unit, without checking the support means for a degree of readiness for discard, a service report indicating when the degree of readiness for discard has exceeded a defined value for one of the sections and the support means has to be exchanged;

indicating that the support means is ready for exchange when the degree of readiness for discard of one of the sections exceeds the defined value, and taking the elevator out of operation if the degree of readiness for discard for one of the sections exceeds the defined value.

2. The method according to claim 1 including determining that the support means does not need to be changed as long as the degree of readiness for discard of a section having a highest bending cycle count value does not exceed the maximum permissible number of bending cycles.

3. The method according to claim 1 including determining a type of bending of each section and considering the type of bending in the determination of the degree of readiness for discard.

4. The method according to claim 3 wherein the determining the type of the bending includes detecting which of at least two return rollers causes which type of bending.

5. The method according to claim 4 including considering a reverse bending type of bending more strongly than a simple bending type of bending in the determination of the degree of readiness for discard, wherein the reverse bending type is multiplied by the weighting factor in the determination of the degree of readiness for discard.

6. The method according to claim 1 including considering a looping angle and/or diameter of the at least one return roller in the determination of the degree of readiness for discard, wherein the weighting factor is selected based on the looping angle of the support means and/or the diameter of the at least one return roller.

7. The method according to claim 1 including generating a service report when the degree of readiness for discard for one of the sections has exceeded a predefined value.

8. The method according to claim 1 including monitoring the support means with an optical checking device.

9. The method according to claim 1, wherein each of the alternate bendings is multiplied by the weighting factor based on the bending type, the return roller diameter, a looping angle of the support means, and the load.

10. A method for detecting the replacement state of wear of a support means of an elevator, wherein the support means is guided over a drive pulley and/or at least one return roller and connects an elevator car with a counterweight, comprising the following steps:

providing a control for controlling the elevator and generating call data;

dividing the support means into several sections and assigning an associated memory position in a memory as an alternate bending counter for each of the sections;

providing an evaluating unit connected with the control and configured to receive call data from the control, for determining for each of the sections a degree of readiness for discard on the basis of floor information received from the control about travel destinations of the elevator and stored in the associated memory position, wherein determining the degree of readiness for discard includes multiplying each of the alternate bendings by at least one weighting factor, the weighting factor selected based on one of a bending type, a diameter, a looping angle, and a load;

generating from the evaluating unit, without checking the support means for a degree of readiness for discard, a service report indicating when the degree of readiness for discard has exceeded a defined value for one of the sections and the support means has to be exchanged; and taking the elevator out of operation if the degree of readiness for discard for one of the sections has exceeded the defined value.

11. The method of claim 10 including determining for each of the sections whether the section during a journey of the elevator car passes over the drive pulley and/or the at least one return roller and if so increasing a degree of readiness for discard representing the replacement state of wear correspondingly for the section including counting alternate bending of each of the sections with the alternate bending counters which alternate bending is decisive for a service life of the section with a greatest number of alternate bendings.

12. A device for determining the replacement state of wear of a support means of an elevator, wherein the support means is guided over a drive pulley and/or at least one return roller and connects an elevator car with a counterweight, comprising:

a control for controlling the elevator and generating floor and call data related to journeys of the elevator car; and an evaluating unit connected with the control and configured to receive call data from the control for determining for each of the sections a degree of readiness for discard on the basis of floor and call data generated from the control about travel destinations of the elevator and stored in a plurality of memory positions in a memory wherein the support means is divided into several sections and each of the sections is assigned an associated one of the memory positions as an alternate bending counter for the section, the evaluating unit generating, without checking the support means for a degree of readiness for discard, a service report indicating when the degree of readiness for discard has exceeded a defined value for one of the sections and the support means has to be exchanged, wherein the evaluating unit is configured to multiply each of the alternate bendings by at least one weighting factor, the at least one weighting factor selected based on one of a bending type, a diameter, a looping angle, and a load; and taking the elevator out of operation if the degree of readiness for discard for one of the sections has exceeded the defined value.

13. The device according to claim 12 including an optical checking device for monitoring the support means.

14. The device according to claim 12 wherein the support means is guided over the drive pulley and a plurality of the return rollers.

* * * * *